March 13, 1945.  H. A. WHITESEL  2,371,202
AIR MIXING APPARATUS
Filed Nov. 22, 1943
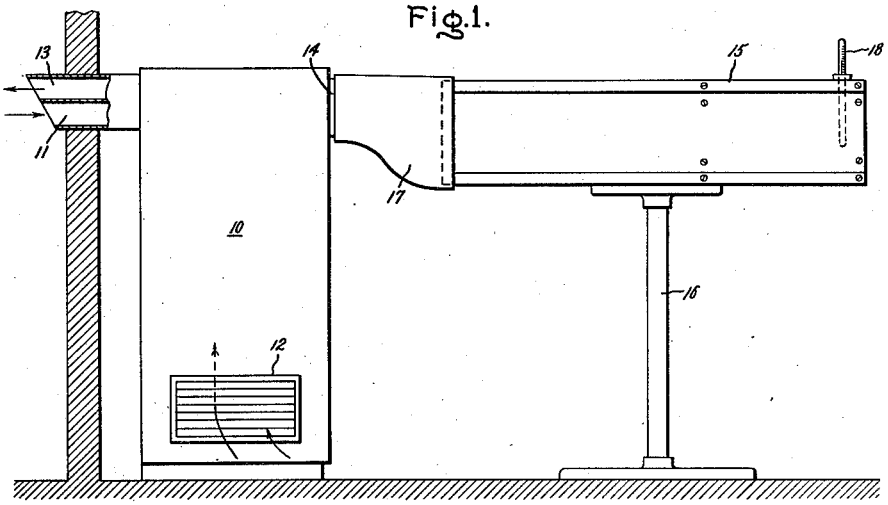
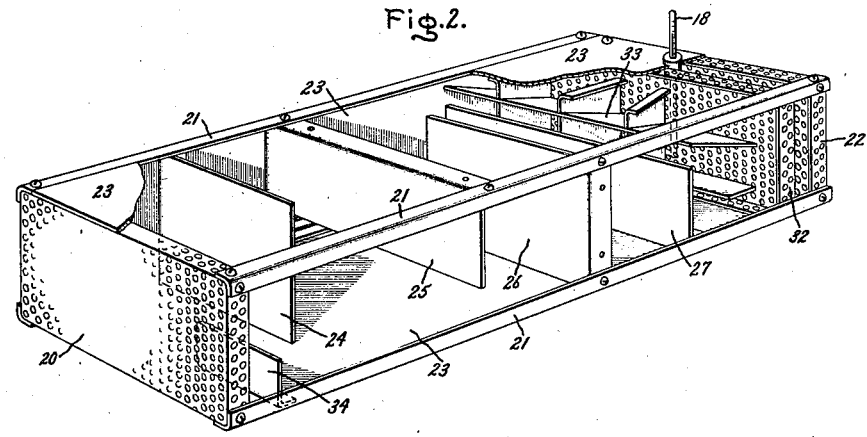
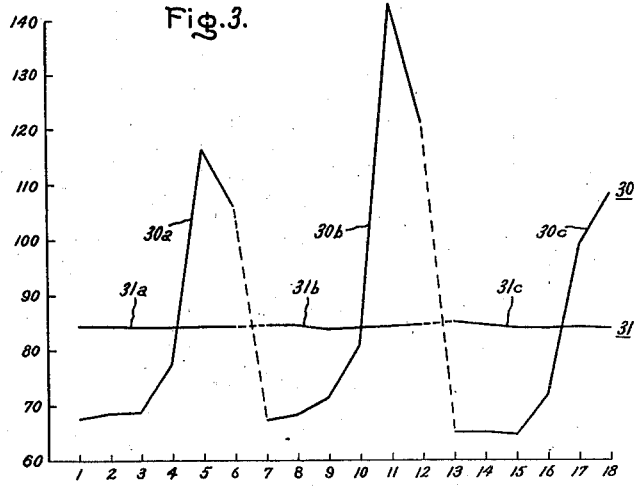
Inventor:
Harry A. Whitesel,
by Harry E. Dunham
His Attorney.

Patented Mar. 13, 1945

2,371,202

UNITED STATES PATENT OFFICE 2,371,202

AIR MIXING APPARATUS

Harry A. Whitesel, Glen Ridge, N. J., assignor to General Electric Company, a corporation of New York Application November 22, 1943, Serial No. 511,270

7 Claims. (Cl. 138—42)

My invention relates to air conditioning apparatus and particularly to apparatus for mixing air after it has been heated or cooled or humidified in such a manner that the temperature and humidity of the air stream are uniform throughout its cross-section.

It is necessary frequently to measure the average temperature or humidity of the air passing through an air conditioning apparatus. When the condition of the air in a stream is changed by its passage over heating or cooling coils or over a humidifier in an air conditioning apparatus there may be a wide variation in the conditions measured at various points throughout the cross-sectional area of the air circulating duct. When it is desired to know the humidity or temperature of the air stream it becomes a problem to determine the correct position of the temperature or humidity measuring device which will give the average condition of the stream. The possibility of error due to non-uniformity of the humidity or temperatures throughout the cross-section of the stream is great; and, even by taking readings at a plurality of points throughout the stream, it may still be very difficult to determine the correct value of relative humidity and temperature. It is, therefore, desirable to provide some arrangement for thoroughly mixing the air in the stream after it has been heated or cooled or humidified so that the atmospheric conditions throughout the entire cross-section of the stream are uniform. Various arrangements of baffles, mixing screens, and orifices have been employed for this purpose; however, the results obtained have not been entirely satisfactory. Accordingly, it is an object of my invention to provide an improved air mixing apparatus of simple construction which will thoroughly mix the air and provide uniform temperature and humidity conditions throughout the entire cross-section of the air stream flowing from the apparatus.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 shows an air mixing apparatus embodying my invention arranged for testing an air conditioning unit; Fig. 2 is an enlarged perspective view of the air mixing apparatus shown in Fig. 1 with most of the top wall and front side removed to show the interior; and Fig. 3 is a graph representing the operating characteristics of the apparatus.

Referring now to the drawing, Fig. 1 illustrates an air conditioning unit 10 of a portable type frequently employed for conditioning the air in a single room and which is provided with an outdoor air inlet duct 11 and an indoor or return air inlet 12. The construction and arrangement of the interior of the air conditioning unit forms no part of the present invention and has not been illustrated. In apparatus of this type the air taken in from the outdoors through the duct 11 may be employed to cool refrigerating apparatus located within the unit 10 and also to add fresh air to the conditioned air stream; and one portion of the room air taken in through the inlet 12 may be conditioned and returned to the room while another portion may be discharged to the outside through an outlet duct 13. The duct 13 may also be arranged to discharge the spent portion of the outdoor air employed as a cooling medium for the refrigerating apparatus. Many arrangements of air conditioning apparatus of this general type are well known in the art and further illustration is deemed unnecessary. In the following description reference is made primarily to changes in temperature. It will be understood, however, that a thorough mixing of the air insures both uniform temperature and uniform relative humidity over the entire cross-section of the air discharged from the apparatus. Furthermore, other atmospheric conditions of the air will be made uniform by this mixing, for example, if some substance such as a disinfectant is introduced into the air stream, it will be spread uniformly throughout the stream.

The air after having been conditioned in the unit 10 is discharged through an outlet 14 in the upper portion of the unit. The temperatures throughout the cross-section of the air discharged through the outlet 14 may vary considerably and in order to test the apparatus it is desirable to provide complete mixing of the air so that a temperature reading taken by a single thermocouple or thermometer is sufficient to determine the average temperature of the air. In order to accomplish this thorough mixing, an apparatus 15 is arranged in front of the unit 10 on a stand 16 and is connected to the unit 10 through a suitable duct 17, which may be a flexible canvas duct, for conveying all the air from the outlet 14 to the apparatus 15. Apparatus 15 is provided with a thermometer or other temperature measuring device 18 located at the outlet of the apparatus to measure the temperature of the mixed air.

The details of construction of the apparatus 15 are shown in Fig. 2. Air entering the apparatus 15 from the duct 17 passes first through a perforated mixing plate or grille 20 which is provided to insure substantially uniform velocity of the air throughout the cross-section of the stream entering the apparatus 15. In the construction illustrated, the apparatus 15 comprises a duct made by securing a plurality of longitudinal angle irons 21 to the corners of the grille structure 20 and a similar grille structure 22 at the outlet of the duct; side walls of sheet metal or other suitable material as indicated at 23 are secured to the structure and complete the closed rectangular duct. I have found that by providing a plurality of solid baffles 24, 25, 26 and 27, constructed and arranged in a manner to be described, it is possible to so thoroughly mix the air flowing through the apparatus 15 that the temperatures are uniform throughout the entire cross-section of the stream where it is discharged from the apparatus. Each of the baffles 24, 25, 26 and 27 has an area which is preferably of the order of two-thirds the area of the cross-section of the duct, smaller areas may be suitable, however, areas of the order of one-half the area of the duct have been found to be unsatisfactory in that complete uniformity of the temperature of the discharged air was not obtained. The maximum area of the baffles is limited by the required flow of air through the duct, it being obvious that it is undesirable to provide more restriction of the cross-sectional area of the duct than is necessary.

Each of the baffles is rectangular and extends from one side of the duct toward the opposite side and in engagement with the other two sides so that an open area of substantially one-third the area of the cross-section of the duct is provided adjacent one edge of each baffle. The baffle 24, as illustrated, extends from the rear edge of the duct in engagement with the top and bottom walls; the baffle 25 extends from the top of the duct in engagement with the front and rear walls; the baffle 26 extends from the front wall in engagement with the top and bottom walls and the baffle 27 extends from the bottom wall in engagement with the front and rear walls. This progressive displacement of the baffles, such that each succeeding baffle is in effect rotated about the central axis of the duct through a right angle with respect to the preceding baffle, provides a tortuous and generally helical path for the stream of air which changes its direction at each baffle as it passes through the duct. The spacing of the baffles longitudinally of the duct is made sufficient to secure free passage of the air. This spacing is not critical but should, of course, be sufficiently great not to restrict the passage of the air.

An apparatus constructed as shown in Fig. 2 when tested provided thorough mixing of the air is illustrated in the graph of Fig. 3. In Fig. 3 the temperatures are shown which prevail throughout the cross-section of the duct. The curve 30 represents temperatures prevailing at the inlet of the duct adjacent the screen 20 and it is readily apparent that great variations were present and, consequently, thermometers placed in the outlet of the apparatus 10, that is, near the inlet of the duct 15 would indicate widely varying temperatures. Temperatures in corresponding positions at the outlet of the duct 15 were recorded and are represented by the curve 31 which indicates substantially uniform temperatures throughout the entire area. Each of the curves 30 and 31 have been indicated as comprising three sections indicated by the letters a, b, and c, respectively, and connected by dotted line portions. The temperatures for the curves of Fig. 3 were obtained by placing thermocouples in three rows of six thermocouples each distributed substantially uniformly over the inlet and outlet areas of the duct. The positions of the thermocouples are numbered from 1 to 18 on the graph, and each row comprises six consecutive members, the top, middle and bottom rows being indicated by the number of the curve with the letters a, b, and c, respectively, affixed thereto. It is thus readily apparent that the possibility of error in determining the average temperature of the air has been minimized.

In constructing the apparatus 15 it may be found desirable to provide a second velocity distributing screen in front of the screen 22 at the outlet as indicated at 32, and it may also be desirable to insure a direct or straight air discharge by providing a plurality of sheet metal air deflecting grids or baffles indicated generally at 33. These additional grids and screens are not necessary to insure uniform temperatures throughout the cross-sectional area of the outlet; their purpose is merely to provide uniform outlet air direction and velocity in addition to uniform temperature. Variations in the velocity distribution may further be minimized by providing a small auxiliary inlet baffle indicated at 34 and located so that it cuts off the direct line of flow from the inlet of the unit to the baffle 26. This auxiliary baffle is not essential, however, to insure uniform temperatures at the outlet.

The dimensions of the apparatus 15 are selected so that, for the particular air conditioning apparatus to be tested, the apparatus 15 will not produce an undesirable pressure drop.

From the foregoing it is readily apparent that I have provided a very simple and easily constructed arrangement which nevertheless provides thorough mixing of the air and insures uniform temperatures and relative humidities throughout the cross-section of the air stream discharged from the apparatus. This apparatus may, of course, be employed as an integral part of an air conditioning system should it be desired to provide continuous recording of the air temperature or relative humidity or should a uniform discharge condition be desired for other reasons.

While I have shown and described my invention in connection with an apparatus employed for testing air conditioning units, other applications will readily be apparent to those skilled in the art. I do not, therefore, desire my invention to be limited to the specific arrangement illustrated and described and I intend by the appended claims to cover all modifications that fall within the spirit and scope of my invention.

What I claim as new and desire to secure by Letters Patent in the United States is:

1. In an apparatus for effecting thorough mixing of the air in a stream to provide uniform atmospheric conditions throughout the cross-section of the stream, comprising a duct arranged to convey the stream of air, and a plurality of substantially imperforate baffles arranged in said duct transversely thereof at abrupt angles and spaced from one another longitudinally of said duct, each of said baffles being arranged to provide an open area adjacent one of its edges substantially equal to one-third the cross-sectional area of the duct, each succeeding baffle being arranged so that the open area provided thereby is displaced progressively about the central axis of said duct at an angle with respect to the open area provided by the preceding baffle whereby a generally helical air path is provided through said duct.

2. An apparatus for effecting thorough mixing of the air in a stream to provide uniform atmospheric conditions throughout the cross-section of the stream, comprising a duct arranged to convey the stream of air, and at least four substantially imperforate baffles arranged in said duct transversely thereof at abrupt angles and spaced from one another longitudinally of said duct, each of said baffles providing an open area between one edge thereof and the walls of said duct, each of said open areas comprising substantially one-third the area of the cross-section of said duct, each succeeding baffle being arranged so that the open area provided thereby is displaced progressively about the central axis of said duct substantially at right angles with respect to the open area provided by the preceding baffle whereby a generally helical air path is provided through said duct.

3. An apparatus for effecting thorough mixing of the air in a stream to provide uniform atmospheric conditions throughout the cross-section of the stream, comprising a duct of rectangular cross-section arranged to convey the stream of air, and a plurality of substantially imperforate baffles arranged in said duct transversely thereof and spaced from one another longitudinally of said duct, each of said baffles having an area greater than one-half of the cross-sectional area of said duct and engaging the walls of said duct on three sides thereof whereby an open area is provided between the baffle and the duct on the fourth side thereof, each succeeding baffle being angularly displaced about the central axis of said duct progressively with respect to the preceding baffle whereby the fourth sides of adjacent baffles lie on adjoining sides of said duct and a generally helical air path is provided through said duct.

4. An apparatus for effecting thorough mixing of the air in a stream to provide uniform atmospheric conditions throughout the cross-section of the stream, comprising a duct of rectangular cross-section arranged to convey the stream of air, and a plurality of substantially imperforate baffles arranged in said duct transversely thereof and spaced from one another longitudinally of said duct, each of said baffles having an area substantially two-thirds that of the cross-sectional area of said duct and engaging the walls of said duct on three sides thereof whereby an open area is provided between the baffle and the duct on the fourth side thereof, each succeeding baffle being displaced progressively with respect to the preceding baffle whereby said open areas left by adjacent baffles lie along adjoining sides of said duct and a generally helical air path is provided through said duct.

5. An apparatus for effecting thorough mixing of the air in a stream to provide uniform atmospheric conditions throughout the cross-section of the stream, comprising a duct having an inlet and outlet arranged to convey the stream of air, a diffusing screen adjacent said inlet for equalizing the velocity of the air throughout the cross-section of said inlet, and a plurality of substantially imperforate baffles arranged in said duct transversely thereof and spaced longitudinally of said duct from one another and from said inlet and said outlet, each of said baffles having the same area and leaving an open area of the duct adjacent one edge of the baffle, each succeeding baffle being arranged so that the open area provided thereby is displaced progressively about the central axis of said duct at an angle with respect to the open area provided by the preceding baffle whereby a generally helical air path is provided through said duct.

6. An apparatus for effecting thorough mixing of the air in a stream to provide uniform atmospheric conditions throughout the cross-section of the stream, comprising a duct having an inlet and outlet and arranged to convey the stream of air, a diffusing screen adjacent said inlet for equalizing the velocity of the air throughout the cross-section of said inlet, a plurality of substantially imperforate baffles arranged in said duct transversely thereof and spaced longitudinally of said duct from one another and from said inlet and said outlet, each of said baffles having the same area and leaving an open area of the duct adjacent one edge of the baffle, each succeeding baffle being arranged so that the open area provided thereby is displaced progressively about the central axis of said duct at an angle with respect to the open area provided by the preceding baffle whereby a generally helical air path is provided through said duct, a diffusing screen adjacent said outlet, and a set of air deflecting baffles arranged between said screen and the last of said imperforate baffles for directing the air discharged from said duct in a generally straight path from said outlet.

7. An apparatus for effecting thorough mixing of the air in a stream to provide uniform atmospheric conditions throughout the cross section of the stream, comprising means forming a duct, partitions dividing said duct into at least four compartments, said duct having an inlet communicating with one of said compartments and an outlet communicating with another of said compartments, said partitions being constructed to provide openings between said compartments and each adjacent a wall of said duct, each of said openings having an area less than one-half that of the cross-sectional area of said inlet but sufficiently large to afford relatively free passage of the air stream and said partitions being arranged to produce at least three changes in direction of the air stream and to conduct the stream of air through said duct in a tortuous path.

HARRY A. WHITESEL.